(12) United States Patent
Kishi et al.

(10) Patent No.: US 6,709,666 B2
(45) Date of Patent: Mar. 23, 2004

(54) INSECTICIDAL MAT AND HEAT-TRANSPIRATION INSECTICIDAL METHOD USING THE SAME

(75) Inventors: Mie Kishi, Takatsuki (JP); Koji Nakayama, Toyonaka (JP); Yoshio Katsuda, Nishinomiya (JP)

(73) Assignee: Dainihon Jochugiku Co., Ltd., Osaka (JP)

( * ) Notice: Subject to any disclaimer, the term of this patent is extended or adjusted under 35 U.S.C. 154(b) by 0 days.

(21) Appl. No.: 09/865,576

(22) Filed: May 29, 2001

(65) Prior Publication Data

US 2002/0007584 A1 Jan. 24, 2002

(30) Foreign Application Priority Data

May 31, 2000 (JP) ........................ 2000-162861
May 10, 2001 (JP) ........................ 2001-140096

(51) Int. Cl.$^7$ .............................................. A01N 25/08
(52) U.S. Cl. .................... 424/411; 424/405; 424/40; 514/531
(58) Field of Search ................ 424/405–409, 424/411, DIG. 10; 544/531, 919; 43/144

(56) References Cited

U.S. PATENT DOCUMENTS 6,074,656 A * 6/2000 Katsuda et al. ............. 424/411

FOREIGN PATENT DOCUMENTS

| JP | 5-81801 A | | 4/1993 |
| JP | 5-81801 | * | 5/1993 |
| JP | 10 72302 | * | 3/1998 |
| JP | 10-194904 | | 7/1998 |
| JP | 11-127755 | | 5/1999 |

* cited by examiner

Primary Examiner—Neil S. Levy
(74) Attorney, Agent, or Firm—Oliff & Berridge, PLC

(57) ABSTRACT

An insecticidal mat which is applied to a portable heat-transpiration apparatus and is capable of maintaining the insecticidal effect continuously over 8 hours or more even in an open space, and a heat-transpiration insecticidal method using the same. The insecticidal mat comprises a fibrous mat having a size of 1,000 to 2,500 mm$^2$ which contains 250 to 600 mg of allethrin as an insecticidal ingredient, 600 to 1,000 mg of piperonyl butoxide as a volatilization controlling agent and 10 to 100 mg of at least one member selected from the group consisting of 2,5-di-t-butylhydroquinone, 3,5-di-t-hydoxytoluene and 3-t-butyl-4-hydroxyanisole as a volatilization controlling agent per mat, wherein the mat is used by setting on a radiation plate which has an area of 1,000 to 2,500 mm$^2$, has a temperature of 150 to 190° C. at its central portion, and has a temperature difference between the central portion and its edge portion of 10° C. or less.

2 Claims, 1 Drawing Sheet

INSECTICIDAL MAT AND HEAT-TRANSPIRATION INSECTICIDAL METHOD USING THE SAME

BACKGROUND OF THE INVENTION

1. Field of the Invention

The present invention relates to an insecticidal mat containing an insecticidal ingredient, and to a heat-transpiration insecticidal method in which the mat is set on a radiation plate of a portable heat-transpiration apparatus to thereby transpire the insecticidal ingredient.

2. Description of the Related Art

Hitherto, as a method of heat-transpiring an insecticidal ingredient for killing insects or the like, (1) a mosquito-repellent incense, (2) an electric mosquito-repellent mat have been used favorably, and (3) a liquid mosquito-repellent, that is, a method of heat-transpiring an insecticidal solution by soaking an absorbent wick in the insecticidal solution and heating the upper part of the wick has been popular in recent years.

Of those, the electric mosquito-repellent mat works by means of setting a fibrous mat impregnated with an insecticidal ingredient on a radiation plate of the heat-transpiration apparatus, and heating the mat with electricity to transpire the insecticidal ingredient contained therein. The temperature at the central portion of the radiation plate is generally set in the range of 140 to 180° C. The mat which is effective for 8 to 10 hours in a room of about 10 m$^2$ contains, for example, about 40 mg of allethrin as the insecticidal ingredient per mat. However, such an electric mosquito-repellent mat is for use in a closed room, and of course cannot be used outdoors where there is no power supply. For this reason, development of a portable mosquito-repellent utilizing a battery, or oxidation heat or burning heat of liquefied gas is progressing. For example, Japanese Patent Examined Publication No. Hei. 5-81801 discloses a portable heat-transpiration apparatus comprising a burner means which flame burns a fuel in a pipe to heat the pipe as a heating member, and a disposable and exchangeable fuel cartridge which supplies a fuel to this burner means, wherein the fuel cartridge has a fuel supply valve means which controls flow of fuel. Recently, mosquito-repellent sets utilizing this portable heat-transpiration apparatus are commercially available. However, its use time is short as about 4 hours, and improvement is demanded in the point of sustainability of the insecticidal effect, or the like.

SUMMARY OF THE INVENTION

An object of the present invention is to provide an insecticidal mat which is applied to a portable heat-transpiration apparatus and is capable of continuously maintaining an insecticidal effect over 8 hours or longer even in an open space such as the outdoors, and a heat-transpiration insecticidal method using the same.

In order to attain the object described above, the present inventors investigated in detail the shape of a fibrous mat, the kind and composition of an insecticidal ingredient impregnated in the fibrous mat, and a combination with performance of a portable heat-transpiration apparatus, to thereby find that the insecticidal effect can continuously be maintained over 8 hours or longer even in an open system space such as the outdoors.

That is, a first aspect of the present invention relates to an insecticidal mat comprising a fibrous mat having a size of 1,000 to 2,500 mm$^2$ which contains 250 to 600 mg of allethrin as an insecticidal ingredient, 600 to 1,000 mg of piperonyl butoxide as a volatization controlling agent and 10 to 100 mg of at least one member selected from the group consisting of 2,5-di-t-butylhydroquinone, 3,5-di-t-butyl-4-hydroxytoluene and 3-t-butyl-4-hydroxyanisole as a volatization controlling agent per mat, wherein the mat is used by setting on a radiation plate which has an area of 1,000 to 2,500 mm$^2$, has a temperature of 150 to 190° C. at its central portion, and has a temperature difference of 10° C. or less between the central portion and its edge portion.

In the present invention, the fibrous mat having a size of 1,000 to 2,500 mm$^2$ is used in order to increase a transpiration amount of the insecticidal ingredient per unit time, thereby exhibiting a sufficient insecticidal effect even in an open space.

As the material of the fibrous mat, that of the same quality as the conventional mosquito-repellent mats such as pulp, linter, or a mixture of them can be used. The mat having a thickness of 1.5 to 3.0 mm can be used with ease.

The insecticidal ingredient used in the present invention is allethrin of a pyrethroid compound having high safety. The allethrin has a vapor pressure at 20° C. of 5.6 mPa and is suitable as an insecticidal ingredient for a heat-transpiration apparatus used in an open space. Optical isomers based on asymmetric carbon in a chemical structure, such as each or any mixtures of pynamin forte, bioallethrin, esbiothrin and esbiol, can of course be included in the insecticidal ingredient of the present invention.

The allethrin is contained in an amount of 250 to 600 mg per mat. If the amount is less than 250 mg, the insecticidal effect cannot be exhibited over a long period of time. On the other hand, if the amount exceeds 600 mg, there is caused difficulty in the impregnation in the insecticidal mat, which is not preferable.

The insecticidal mat of the present invention contains a volatilization controlling agent in order to sustain the insecticidal effect in an open space. The volatilization controlling agent is used in a combination of 600 to 1,000 mg of piperonyl butoxide which is suitable for allethrin and 10 to 100 mg of at least one member selected from the group consisting of 2,5-di-t-butylhydroquinone (compound A), 3,5-di-t-butyl-4-hydroxytoluene (compound B) and 3-t-butyl-4-hydroxyanisole (compound C). That is, compounds other than piperonyl butoxide known as a volatilization controlling agent, such as butyl stearate or octachlorodipropyl ether, are not suitable for use in the present invention, and satisfactory volatilization controlling effect cannot be obtained by the use of piperonyl butoxide alone. The present invention is characterized in the combination of at least one member selected from the group consisting of compound A, compound B and compound C with piperonyl butoxide.

If the amount of piperonyl butoxide contained is less than 600 mg, the volatilization controlling effect becomes poor, and on the other hand, if the amount exceeds 1,000 mg, the insecticidal effect is suppressed, and also there is caused difficulty in the impregnation in an insecticidal mat, which are not preferable.

At least one member selected from the group consisting of compound A, compound B and compound C is contained in an amount of 10 to 100 mg, preferably 30 to 60 mg, per mat, thereby exhibiting the volatilization effect in combination. If the amount is less than 10 mg, the volatilization controlling effect is not obtained, and on the other hand, if the amount exceeds 100 mg, the insecticidal effect is suppressed. Further, because those compounds are crystalline, there is the problem that if the amount thereof exceeds 100 mg, it is difficult to dissolve. Of the above three kinds of compounds, 2,5-di-t-butylhydroquinone (compound A) is most preferable, and combination of this compound with piperonyl butoxide exhibits particularly excellent volatilization performance, thereby sustaining the insecticidal effect over a long period of time.

In preparing the insecticidal mat of the present invention, an undiluted solution (base solution) is used which is generally obtained by adding perfumes, dyestuffs and the like, and also solvents such as kerosene, to the above described allethrin and volatilization controlling agent. However, there is set a limit on the maximum holding liquid amount in the mat. Therefore, the amount of undiluted solution is preferably used in an amount of 1.5 g or less per mat in the case of the mat having a size of 35×50 mm and a thickness of 2.0 mm.

In the present invention, insecticidal ingredients other than allethrin, for example, furamethrin, prallethrin, empenthrin, transfluthrin, acaricides, repellents, spatial bactericides and antibacterials such as hinokitiol, linalool, citral, pinene, menthol, terpene alcohols, etc., and fungicides and the like can be added to give a multipurpose composition so long as the transpiration property of the allethrin is not impaired.

The portable heat-transpiration apparatus used in the present invention is used in an open space such as outdoors, and therefore requires efficient and high heat energy as compared with use in indoors. For this reason, the radiation plate is required to have an area of 1,000 to 2,500 $mm^2$, a temperature at the central portion of 150 to 190° C., and temperature difference between the central portion and edge portion thereof of 10° C. or smaller. The apparatus described in Japanese Patent Examined Publication No. Hei 5-81801 is suitable as the portable heat-transpiration apparatus capable of maintaining this heating temperature stable. That is, the apparatus is a type comprising a burner means which flame burns a fuel in a pipe to heat the pipe as a heating member, and a disposable and exchangeable fuel cartridge which supplies a fuel to this burner means, wherein the fuel cartridge has a fuel supply valve means which controls flow of fuel. The fuel is generally butane gas. When, for example, a fuel cartridge containing 12 g of butane gas is mounted to this heat-transpiration apparatus, it is possible to continuously use for about 10 hours.

The portable heat-transpiration apparatus used in the present invention is appropriately equipped with switch, safety protection cover, heat generation indicator and the like in addition to the heating means, heat radiation plate, fuel supply means and the like. However, its specification is not particularly limited, and may be determined according to the conventional heat-transpiration apparatus.

A second aspect of the present invention is the structure according to the first aspect, wherein the portable heat-transpiration apparatus is the above-described fuel cartridge of flame burning type.

A third aspect of the present invention relates to a heat-transpiration insecticidal method, comprising impregnating a fibrous mat having a size of 1,000 to 2,500 $mm^2$ with 250 to 600 mg of allethrin as an insecticidal ingredient, 600 to 1,000 mg of piperonyl butoxide as a volatilization controlling agent, and 10 to 100 mg of at least one member selected from the group consisting of 2,5-di-t-butylhydroquinone, 3,5-di-t-butyl-4-hydroxytoluene and 3-t-butyl-4-hydroxyanisole as a volatization controlling agent per mat, setting the mat on a radiation plate of a portable heat-transpiration apparatus, which has an area of 1,000 to 2,500 $mm^2$, has a temperature of 150 to 190° C. at its central portion, and has a temperature difference between the central portion and its edge portion of 10° C. or less, and maintaining the insecticidal effect continuously over 8 hours or more in an open space.

A fourth aspect of the present invention is the method according to the third aspect, wherein the portable heat-transpiration apparatus is the above-described fuel cartridge of flame burning type.

The combination of the insecticidal mat and the portable heat-transpiration apparatus, having the structures described above is particularly useful in the case of using in an open space such as camp, fishing, barbecue, garden work or the like. High insecticidal effect is maintained to sanitary noxious insects such as mosquito or fly, nuisance insects such as blackfly (gnat), a chironomid, a casemaking clothes moth, a webbing clothes moth, a carpet beetle and the like over 8 hours or more. In addition, safety, usability and the like are excellent.

DETAILED DESCRIPTION OF THE PREFERRED EMBODIMENT

Figure 1:
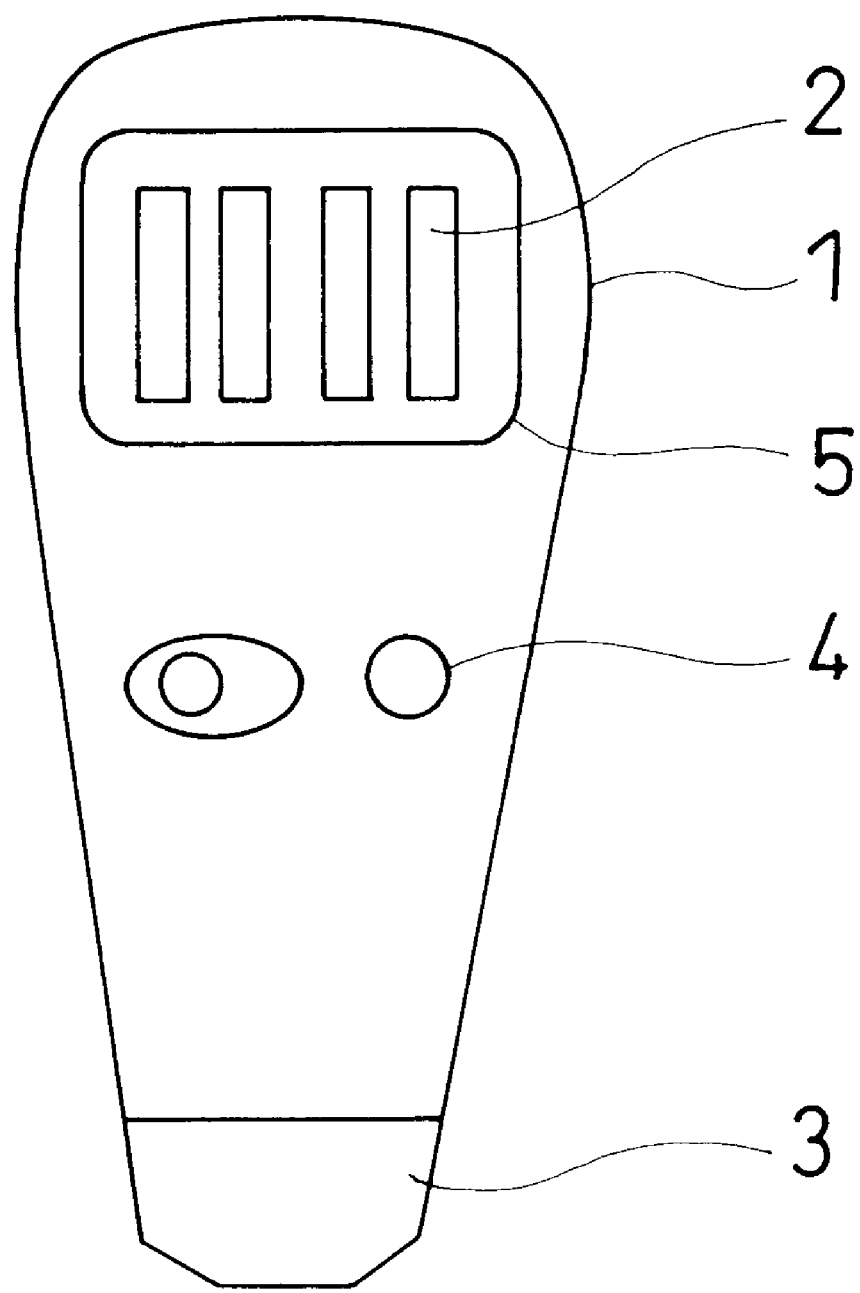
FIG. 1 is a plan view showing the portable heat-transpiration apparatus used in the present invention.

The present invention will be further described in detail with reference to the following examples and examination examples.

EXAMPLE 1

The fibrous mat of 35×50 mm in size (1,750 $mm^2$) and 2.0 mm in thickness was impregnated with an undiluted mat solution containing 500 mg of dl,d-cis/trans-allethrin (trade name: Pynamineforte) as an insecticidal ingredient, 800 mg of piperonyl butoxide and 50 mg of 2,5-di-t-butylhydroquinone as a volatilization controlling agent, a slight amount of perfume, a blue dye and a small amount of kerosene. This insecticidal mat was set on a radiation plate 2 (size: 35×50 mm (1,750 $mm^2$), radiation plate temperature at the central portion: 180° C.; radiation plate temperature at the edge portion (position of 5 mm inside from the top): 178° C.) of a heat-transpiration apparatus body 1 shown in FIG. 1, and a fuel cartridge (not shown) filled with 12 g of butane gas was mounted to a cartridge housing portion 3. Switch 4 was on and the apparatus was used in barbecue spot. As a result, sufficient insecticidal effect was exhibited over 10 hours or more. Further, there was no possibility of contacting the radiation plate by means of a safety protection cover 5 provided on the apparatus, and there was not a problem even in the point of safety.

EXAMPLE 2

The fibrous mat of 35×42 mm in size (1,260 $mm^2$) and 2.5 mm in thickness was impregnated with a kerosene solution containing 300 mg of d-trans-allethrin (trade name: Esbiothrin) as an insecticidal ingredient, 800 mg of piperonyl butoxide and 50 mg of 5-di-t-butyl-4-hydroxytoluene as a volatilization controlling agent, and a slight amount of a blue dye. The insecticidal mat thus obtained was set on the radiation plate 2 (size: 35×50 mm (1,750 $mm^2$), radiation plate temperature at the central portion: 170° C.; radiation plate temperature at the edge portion (position of 5 mm inside from the top): 167° C.) of the heat-transpiration apparatus body 1 of Example 1, and the apparatus was used in a tent placed in outdoor. As a result, biting by mosquitoes was not received over 10 hours.

Test Example 1

Insecticidal mats as shown in Table 1 were prepared according to Examples 1 and 2 and set on the given heat-transpiration apparatuses to conduct insecticidal effect test.

Insecticidal Effect Test

A net box containing about 20 *Culex pipiens* was hung from a ceiling of a tent of 2 $M^3$ with a wind window set up outdoors after 1 hour and after 8 hours from the start of test, and the knock-down effect was evaluated in the tent. The values given in Table 1 are shown as the relative effective ratios in the case where the effect of the mosquito-repellent incense containing 0.3% of Pynamin forte was 1.00.

mg (Comparison 3), the action of controlling volatilization of allethrin was not sufficient and sustainability of the insecticidal effect was poor. On the other hand, when the amount of piperonyl butoxide contained exceeded 1,000 mg as in Comparison 4 or when the amount of compound A contained exceeded 100 mg as in Comparison 5, the insecticidal effect was suppressed and also there is caused difficulty in dissolution of the volatilization controlling agent and impregnation step of the prepared undiluted solution in the insecticidal mat, which were not preferable. Further, when butyl stearate was used in place of piperonyl butoxide (Comparison 6), when prallethrin was used as the insecticidal ingredient (Comparison 7) or when empenthrin (vapor pressure at 20° C.: 87 mPa) was used (Comparison 8), satisfactory performance was not obtained in the point of sustainability of the insecticidal effect. Therefore, it was recognized in the formulation that the composition comprising a combination of allethrin as the insecticidal ingredient, piperonyl butoxide as the volatilization controlling agent

TABLE 1

|  |  | Insecticidal mat (mg/mat) | | | Radiation plate temperature | | Relative insecticidal effect | |
|---|---|---|---|---|---|---|---|---|
|  |  |  | Volatilization controlling agent | | | | | |
|  |  | Allethrin | Piperonyl butoxide | Other compound | Size (mm²) | Central portion (° C.) | Edge portion (° C.) | After 1 hour | After 8 hours |
| Example | 1 | Pynamin forte 550 | 850 | A 50 | 1750 | 180 | 178 | 1.97 | 1.56 |
|  | 2 | Pynamin forte 550 | 850 | B 50 | 1750 | 180 | 178 | 2.03 | 1.29 |
|  | 3 | Pynamin forte 550 | 850 | C 50 | 1750 | 180 | 178 | 2.01 | 1.24 |
|  | 4 | Esbiol 270 | 1000 | A 40 + C 30 | 2400[2] | 175 | 172 | 1.88 | 1.50 |
|  | 5 | Esbiothrin 320 | 600 | B 100 | 1100 | 160 | 157 | 2.09 | 1.41 |
|  | 6 | Bioallethrin 400 | 750 | A 10 | 1440 | 185 | 176 | 1.95 | 1.36 |
| Comparative Example | 1 | Pynamin forte 150 | 800 | A 50 | 1500 | 180 | 178 | 1.28 | 0.09 |
|  | 2 | Pynamin forte 500 | 400 | A 50 | 1500 | 180 | 178 | 1.81 | 0.36 |
|  | 3 | Pynamin forte 500 | 600 | A 5 | 1500 | 180 | 178 | 1.75 | 0.82 |
|  | 4 | Pynamin forte 500 | 1300[3] | A 50 | 1500 | 180 | 178 | 1.19 | 0.85 |
|  | 5 | Pynamin forte 500 | 800 | A 150[3] | 1500 | 180 | 178 | 1.17 | 0.78 |
|  | 6 | Pynamin forte 500 | E[4] 600 | A 50 | 1500 | 180 | 178 | 1.64 | 0.86 |
|  | 7 | Prallethrin[5] 250 | 600 | A 20 | 1500 | 180 | 178 | 1.60 | 0.80 |
|  | 8 | Empenthrin 600 | 800 | A 50 | 1500 | 180 | 178 | 1.53 | 0.09 |
|  | 9 | Pynamin forte 550 | 900[3] | A 50 | 700 | 165 | 162 | 1.20 | 0.87 |
|  | 10 | Pynamin forte 500 | 800 | A 50 | 1500 | 130 | 125 | 0.96 | 0.72 |
|  | 11 | Pynamin forte 500 | 800 | A 50 | 1500 | 170 | 125 | 1.24 | 0.81 |

[1]Volatilization controlling agent
Compound A: 2,5-di-t-butylhydroquinone
Compound B: 3,5-di-t-butyl-4-hydroxytoluene
Compound C: 3-t-butyl-4-hydroxyanisole
[2]Using heat-transpiration apparatus of radiation plate having a size of 2,400 mm²
[3]There is problem on production.
[4]Compound E: butyl stearate
[5]There is problem on safety to men and beasts.

As a result of test, the present invention comprising a combination of the particular insecticidal mat with the particular portable heat-transpiration apparatus maintained an excellent insecticidal effect over 8 hours or more, was convenient and was extremely practical in use. Of the compound A, compound B and compound C used as the volatilization controlling agent in combination with piperonyl butoxide, 2,5-di-t-butylhydroquinone of compound A was most preferable in the point of capable of volatilizing allethrin over a long period of time in further stable manner.

Contrary to this, when the amount of allethrin contained was less than 250 mg (Comparison 1), the insecticidal effect was naturally poor, and when the amount of piperonyl butoside contained was less than 600 mg (Comparison 2) or when the amount of compound A contained was less than 10 and at least one member selected from the group consisting of compound A, compound B and compound C as the volatilization controlling agent in specific ranges is optimal. Further, when the size of the insecticidal mat was less than 1,000 mm² (Comparison 9) or when the portable heat-transpiration apparatus was used, which cannot maintain a given radiation plate temperature stably (Comparisons 10 and 11), such embodiments did not meet the object of the present invention which intends open space use.

The present invention provides the insecticidal mat which is applied to a portable heat-transpiration apparatus and is capable of maintaining the insecticidal effect continuously over 8 hours or more even in an open space, and the heat-transpiration insecticidal method using the same.

What is claimed is:

1. A heat-transpiration insecticidal method, comprising:

impregnating a fibrous mat having a size of 1,000 to 2,500 mm$^2$ with 250 to 600 mg of allethrin as an insecticidal ingredient, 600 to 1,000 mg of piperonyl butoxide as a first volatilization controlling agent, and 10 to 100 mg of at least one member selected from the group consisting of 2,5-di-t-butylhydroquinone and 3,5-di-t-butyl-4-hydroxytoluene as a second volatilization controlling agent per mat;

setting the mat on a radiation plate of a portable heat-transpiration apparatus, which has an area of 1,000 to 2,500 mm$^2$, has a temperature of 150 to 190° C. at its central portion, and has a temperature difference of 10° C. or less between the central portion and its edge portion; and maintaining the insecticidal effect continuously over 8 hours or more in an open space.

2. The method according to claim 1, wherein the portable heat-transpiration apparatus comprises a burner means which flame burns a fuel in a pipe to heat the pipe as a heating member, and a disposable and exchangeable fuel cartridge which supplies a fuel to this burner means, wherein the fuel cartridge has a fuel supply valve means which controls flow of fuel.

* * * * *